(12) United States Patent
Chen et al.

(10) Patent No.: US 9,014,276 B2
(45) Date of Patent: Apr. 21, 2015

(54) METHOD AND SYSTEM FOR 3D VIDEO CODING USING SVC TEMPORAL AND SPATIAL SCALABILITIES

(75) Inventors: Xuemin Chen, Rancho Santa Fe, CA (US); Brian Heng, Irvine, CA (US); Wade Wan, Orange, CA (US); Daniel English, Salem, NH (US); Zhijie Yang, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 788 days.

(21) Appl. No.: 12/840,557

(22) Filed: Jul. 21, 2010

(65) Prior Publication Data

US 2011/0134214 A1 Jun. 9, 2011

Related U.S. Application Data

(60) Provisional application No. 61/266,553, filed on Dec. 4, 2009.

(51) Int. Cl.
*H04N 7/18* (2006.01)
*H04N 19/33* (2014.01)
*H04N 19/597* (2014.01)
*H04N 19/61* (2014.01)

(52) U.S. Cl.
CPC ............. *H04N 19/33* (2014.11); *H04N 19/597* (2014.11); *H04N 19/61* (2014.11)

(58) Field of Classification Search
CPC .................... H04N 13/0055; H04N 19/00769; H04N 13/0239

USPC ..................... 375/240.01–240.29; 348/42–60
See application file for complete search history.

(56) References Cited

U.S. PATENT DOCUMENTS

| | | | |
|---|---|---|---|
| 5,193,000 A * | 3/1993 | Lipton et al. ..................... 348/43 |
| 6,510,177 B1 * | 1/2003 | De Bonet et al. ........ 375/240.16 |
| 7,817,181 B2 * | 10/2010 | Lee ................. 348/43 |
| 7,956,930 B2 * | 6/2011 | Sullivan ........................ 348/581 |
| 2009/0304081 A1 * | 12/2009 | Bourge ..................... 375/240.15 |
| 2010/0165077 A1 * | 7/2010 | Yin et al. ......................... 348/42 |
| 2010/0260268 A1 * | 10/2010 | Cowan et al. ............. 375/240.25 |
| 2011/0074922 A1 * | 3/2011 | Chen et al. ........................ 348/43 |
| 2011/0267423 A1 * | 11/2011 | Suh et al. ......................... 348/42 |
| 2012/0092452 A1 * | 4/2012 | Tourapis et al. ................ 348/43 |
| 2012/0105583 A1 * | 5/2012 | Suh et al. ......................... 348/43 |

* cited by examiner

*Primary Examiner* — Andy Rao
(74) *Attorney, Agent, or Firm* — Foley & Lardner LLP; Christopher J. McKenna; Daniel E. Rose

(57) ABSTRACT

A 3-dimensional (3D) video transmitter may be operable to encode a 3D video to generate a scalable video coding (SVC) base layer and a SVC enhancement layer. A first view such as a first high-resolution view and a second view such as a second high-resolution view of the 3D video in the SVC enhancement layer may be separate frames. A first half-resolution view and a second half-resolution view of the 3D video in the SVC base layer may be packed in a single frame. The first half-resolution view in the SVC base layer may be a base-layer reference for the first high-resolution view in the SVC enhancement layer for inter-layer prediction of spatial scalable coding. The first high-resolution view in the SVC enhancement layer may be an intra-layer reference for the second high-resolution view in the SVC enhancement layer for intra-layer prediction of temporal scalable coding.

20 Claims, 5 Drawing Sheets

100

3D Video Transmitter
110

Transport Stream
120

3D Video Receiver
130

METHOD AND SYSTEM FOR 3D VIDEO CODING USING SVC TEMPORAL AND SPATIAL SCALABILITIES

CROSS-REFERENCE TO RELATED APPLICATIONS/INCORPORATION BY REFERENCE

This patent application makes reference to, claims priority to, and claims benefit from U.S. Provisional Application Ser. No. 61/266,553, which was filed on Dec. 4, 2009.

The present disclosure is related to U.S. application Ser. No. 12/840,568, entitled "Method and System for 3D Video Coding Using SVC Spatial Scalability, " filed on Jul. 21, 2010, the disclosure of which is expressly incorporated herein by reference in its entirety.

Each of the above stated applications is hereby incorporated herein by reference in its entirety.

FIELD OF THE INVENTION

Certain embodiments of the invention relate to video processing. More specifically, certain embodiments of the invention relate to a method and system for 3D video coding using SVC temporal and spatial scalabilities.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV (DTV), a 3D video is often desirable because it is often more realistic to viewers than the 2D counterpart. A 3D video comprises a left view video and a right view video. A 3D video frame may be produced by combining left view video components and right view video components.

Various video encoding standards, for example, MPEG-1, MPEG-2, MPEG-4, H.263, H.264/MPEG-4 advanced video coding (AVC), multi-view video coding (MVC) and scalable video coding (SVC), have been established for encoding digital video sequences in a compressed manner. For example, the MVC standard, which is an extension of the H.264/MPEG-4 AVC standard, may provide efficient coding of a 3D video. The SVC standard, which is also an extension of the H.264/MPEG-4 AVC standard, may enable transmission and decoding of partial bitstreams to provide video services with lower temporal or spatial resolutions or reduced fidelity, while retaining a reconstruction quality that is similar to that achieved using the H.264/MPEG-4 AVC. A modality of scalability in the SVC may comprise temporal scalability, spatial scalability, fidelity scalability and/or combined scalability. The temporal scalability provides a hierarchical prediction structure, while the spatial scalability provides an inter-layer prediction structure.

Most TV broadcasts, and similar multimedia feeds, utilize video formatting standard that enable communication of video images in the form of bitstreams. For example, a bitstream may be a transport stream (TS) which may comprise one or more elementary streams (ES). Packets in the same elementary stream all have the same packet identifier (PID). These video standards may utilize various interpolation and/or rate conversion functions to present content comprising still and/or moving images on display devices. For example, deinterlacing functions may be utilized to convert moving and/or still images to a format that is suitable for certain types of display devices that are unable to handle interlaced content. TV broadcasts, and similar video feeds, may be interlaced or progressive. Interlaced video comprises fields, each of which may be captured at a distinct time interval. A frame may comprise a pair of fields, for example, a top field and a bottom field. The pictures forming the video may comprise a plurality of ordered lines. During one of the time intervals, video content for the even-numbered lines may be captured. During a subsequent time interval, video content for the odd-numbered lines may be captured. The even-numbered lines may be collectively referred to as the top field, while the odd-numbered lines may be collectively referred to as the bottom field. Alternatively, the odd-numbered lines may be collectively referred to as the top field, while the even-numbered lines may be collectively referred to as the bottom field. In the case of progressive video frames, all the lines of the frame may be captured or played in sequence during one time interval. Interlaced video may comprise fields that were converted from progressive frames. For example, a progressive frame may be converted into two interlaced fields by organizing the even numbered lines into one field and the odd numbered lines into another field.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 3D video coding using SVC temporal and spatial scalabilities, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
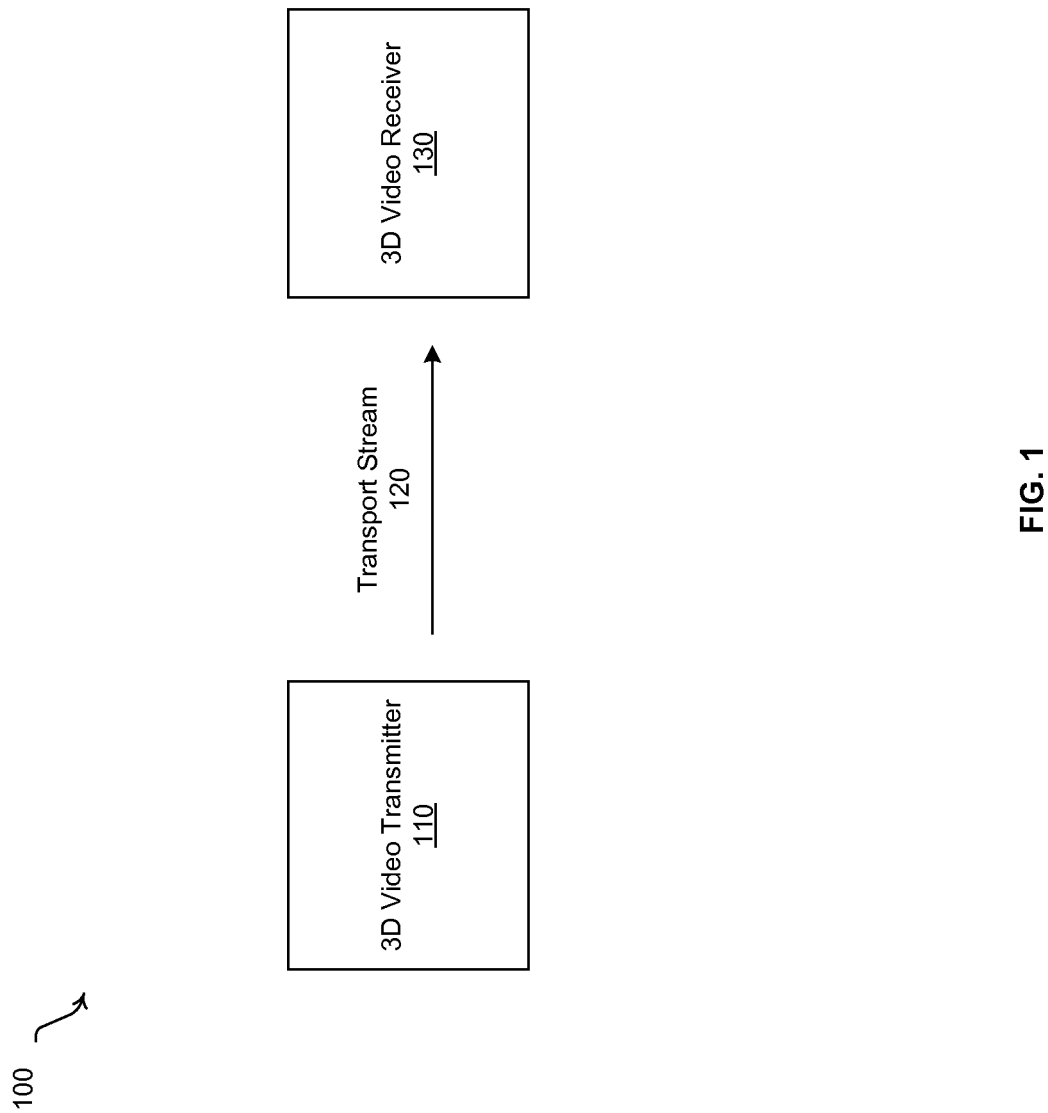
FIG. 1 is a block diagram illustrating an exemplary video communication system that is operable to provide 3D video coding using SVC temporal and spatial scalabilities, in accordance with an embodiment of the invention.

Certain embodiments of the invention can be found in a method and system for 3D video coding using SVC temporal and spatial scalabilities. In various embodiments of the invention, a 3-dimensional (3D) video transmitter may be operable to encode a 3D video to generate a scalable video coding (SVC) base layer and a SVC enhancement layer. A first view and a second view of the 3D video in the SVC enhancement layer may be separate frames. The SVC base layer may comprise a first half-resolution view and a second half-resolution view of the 3D video. The first half-resolution view and the second half-resolution view may be packed in a single frame. For example, the first half-resolution view and the second half-resolution view may be packed in a side-by-side (half) format or in a top-and-bottom (half) format. In this regard, for example, the first half-resolution view may be a left half-resolution view of the 3D video, and the second half-resolution view may be a right half-resolution view of the 3D video. The first view in the SVC enhancement layer may comprise a first high-resolution view and the second view in the SVC enhancement layer may comprise a second high-resolution view. The high-resolution may comprise a resolution that may be greater than half resolution. In this regard, for example, the first high-resolution view may be a left full-resolution view of the 3D video, and the second high-resolution view may be a right full-resolution view of the 3D video. The first half-resolution view in the SVC base layer may be a base-layer reference for the first high-resolution view in the SVC enhancement layer for inter-layer prediction of spatial scalable coding. The first high-resolution view in the SVC enhancement layer may be an intra-layer reference for the second high-resolution view in the SVC enhancement layer for intra-layer prediction of temporal scalable coding.

In an exemplary embodiment of the invention, a total number of bits for the first half-resolution view may be different from a total number of bits for the second half-resolution view. A total number of bits for the first high-resolution view may be different from a total number of bits for the second high-resolution view. The 3D video transmitter may be operable to transmit the first half-resolution view and the second half-resolution view in a single elementary stream to a 3D video receiver. Alternatively, the first half-resolution view may be transmitted in a first elementary stream and the second half-resolution view may be transmitted in a second elementary stream to a 3D video receiver. The 3D video transmitter may be operable to transmit the first high-resolution view and the second high-resolution view in a single elementary stream to a 3D video receiver. Alternatively, the first high-resolution view may be transmitted in a first elementary stream to a 3D video receiver and the second high-resolution view may be transmitted in a second elementary stream to the 3D video receiver. In this regard, the transmitted first half-resolution view may be independently decoded by the 3D video receiver without a reference from other views.

When operating in film mode, the 3D video transmitter may be operable to encode, using pulldown, the 3D video to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. In this instance, for example, the transmitted SVC base layer, which may comprise the first half-resolution view and the second half-resolution view, may be decoded, by the 3D video receiver, to generate a decompressed 3D video with the half-resolution in the interlaced format at the higher frame rate. The transmitted SVC enhancement layer, which may comprise the first high-resolution view and the second high-resolution view, may be decoded to generate a decompressed 3D video with the high-resolution in the progressive format at the original frame rate.

FIG. 1 is a block diagram illustrating an exemplary video communication system that is operable to provide 3D video coding using SVC temporal and spatial scalabilities, in accordance with an embodiment of the invention. Referring to FIG. 1, there is shown a video communication system 100. The video communication system 100 may comprise a 3D video transmitter 110, a transport stream 120 and a 3D video receiver 130.

The 3D video transmitter 110 may comprise suitable logic, circuitry, interfaces and/or code that may be operable to distribute encoded or compressed 3D video content to the 3D video receiver 130 via a bitstream such as the transport stream 120. The 3D video transmitter 110 such as, for example, a headend system may be operable to provide various services such as, for example, distribution, multicast, and/or quality of service necessary for a reliable and timely transmission of the compressed 3D video content to the 3D video receiver 130. The 3D video transmitter 110 may utilize, for example, a cable TV network, a satellite broadcasting network, the Internet protocol (IP) data network such as the Internet, and/or a wireless communication network for delivery of services or the compressed 3D video content to the 3D video receiver 130. The 3D video may be encoded or compressed using a SVC method with temporal scalability and spatial scalability, and transmitted to the 3D video receiver 130 via the transport stream 120, for example.

The 3D video receiver 130 may comprise suitable logic, circuitry, interfaces and/or code that may be operable to receive the compressed 3D video via a bitstream such as the transport stream 120 from the 3D video transmitter 110. The 3D video receiver 130 such as, for example, a set-top box (STB) may be operable to decode or decompress the received compressed 3D video to generate a decompressed 3D video using, for example, a SVC method with temporal scalability and spatial scalability.

In operation, the 3D video transmitter 110 may be operable to encode a 3D video to generate a SVC base layer and a SVC enhancement layer. A first view and a second view of the 3D video in the SVC enhancement layer may be separate frames. The SVC base layer may comprise a first half-resolution view and a second half-resolution view of the 3D video. The first half-resolution view and the second half-resolution view may be packed in a single frame. For example, the first half-resolution view and the second half-resolution view may be packed in a side-by-side (half) format or in a top-and-bottom (half) format. In an exemplary embodiment of the invention, the first half-resolution view may be a left half-resolution view of the 3D video, and the second half-resolution view may be a right half-resolution view of the 3D video. In another exemplary embodiment of the invention, the first half-resolution view may be a right half-resolution view of the 3D video, and the second half-resolution view may be a left half-resolution view of the 3D video. The first view in the SVC enhancement layer may comprise a first high-resolution view and the second view in the SVC enhancement layer may comprise a second high-resolution view of the 3D video. The high-resolution may comprise a resolution that may be greater than half resolution. In an exemplary embodiment of the invention, the first high-resolution view may be a left full-resolution view of the 3D video, and the second high-resolution view may be a right full-resolution view of the 3D video. In another exemplary embodiment of the invention, the first high-resolution view may be a right full-resolution view of the 3D video, and the second high-resolution view may be a left full-resolution view of the 3D video. The left full-resolution view and the right full-resolution view may be in a stereoscopic format. The first half-resolution view in the SVC base layer may be a base-layer reference for the first high-resolution view in the SVC enhancement layer for inter-layer prediction of spatial scalable coding. The first high-resolution view in the SVC enhancement layer may be an intra-layer reference for the second high-resolution view in the SVC enhancement layer for intra-layer prediction of temporal scalable coding.

A 3D video in the side-by-side (half) format may comprise, for example, a half resolution first view such as the left view and a half resolution second view such as the right view, which may be packed in a side-by-side format or left-and-right format in a frame. A 3D video in the top-and-bottom (half) format may comprise, for example, a half resolution first view such as the left view and a half resolution second view such as the right view, which may be packed in a top-and-bottom format in a frame. A 3D video in the stereoscopic format may comprise, for example, a full resolution first view such as the left view and a full resolution second view such as the right view.

In an exemplary embodiment of the invention, a total number of bits for the first half-resolution view may be different from a total number of bits for the second half-resolution view. A total number of bits for the first high-resolution view may be different from a total number of bits for the second high-resolution view. The 3D video transmitter 110 may be operable to transmit the first half-resolution view and the second half-resolution view in a single elementary stream in the transport stream 120 to a 3D video receiver such as the 3D video receiver 130. Alternatively, the first half-resolution view may be transmitted in a first elementary stream and the second half-resolution view may be transmitted in a second elementary stream in the transport stream 120 to the 3D video receiver 130. The 3D video transmitter 110 may be operable to transmit the first high-resolution view and the second high-resolution view in a single elementary stream in the transport stream 120 to the 3D video receiver 130. Alternatively, the first high-resolution view may be transmitted in a first elementary stream and the second high-resolution view may be transmitted in a second elementary stream in the transport stream 120 to the 3D video receiver 130. In this regard, the transmitted first half-resolution view, which may be used as the base-layer reference, may be independently decoded by the 3D video receiver 130 without a reference from other views.

When operating in film mode, the 3D video transmitter 110 may be operable to encode, using pulldown, the 3D video to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. In this instance, for example, the transmitted SVC base layer, which may comprise the first half-resolution view and the second half-resolution view, may be decoded, by the 3D video receiver 130, to generate a decompressed 3D video with the half-resolution in the interlaced format at the higher frame rate. The transmitted SVC enhancement layer, which may comprise the first high-resolution view and the second high-resolution view, may be decoded to generate a decompressed 3D video with the high-resolution in the progressive format at the original frame rate. In this regard, for example, when operating in film mode, a 3D video in 1080p24 film format at 24 Hz frame rate may be encoded by the 3D video transmitter 110 to generate a SVC base layer in side-by-side (half) 1080i60 interlaced format at 30 Hz frame rate using 3:2 pulldown. In the mean time, the 3D video may be encoded to generate a SVC enhancement layer in stereoscopic 1080p24 format at 24 Hz frame rate. Accordingly, the transmitted SVC base layer which may be in the side-by-side (half) 1080i60 format may be decoded by the 3D video receiver 130 to generate a decompressed 3D video in the side-by-side (half) 1080i60 format. The transmitted SVC enhancement layer which may be in the stereoscopic 1080p24 format may be decoded to generate a decompressed 3D video in frame packing 1080p24 format, for example.

The pulldown is a telecine process which may convert a film frame or a video frame at frame rate to an interlaced video frame at different frame rate. The pulldown may comprise 3:2 pulldown or 2:2 pulldown. For example, a 3D video frame in a 1080p24 format at 24 Hz frame rate may be converted to a 3D video frame in a 1080i60 interlaced format at 30 Hz frame rate (60 Hz field rate) by performing a 3:2 pulldown. A 3D video frame in a 1080p24 format at 24 Hz frame rate may be converted to a 3D video frame in a 1080i50 format at 25 Hz frame rate (50 Hz field rate) by performing a 2:2 pulldown.

A 3D video in the frame packing format may comprise, for example, a full resolution first view such as the left view and a full resolution second view such as the right view, which may be packed in a top-and-bottom format in a frame with twice the normal bandwidth. In this regard, the frame packing format is a full resolution top-and-bottom format or top-and-bottom (full) format.

In an exemplary embodiment of the invention, the SVC base layer stream may be backward compatible with existing advanced video coding (AVC) systems. In this regard, the 3D video receiver 130 may be operable to decode the SVC base layer stream using the AVC method, while the SVC enhancement layer stream may be decoded using the SVC method with temporal scalability and spatial scalability. Accordingly, a 3D video with high resolution such as a full resolution 3D video may be provided using the SVC temporal scalability and spatial scalability. The SVC base layer may provide a half-resolution 3D video which may be compatible with legacy systems such as AVC systems.

Figure 2:
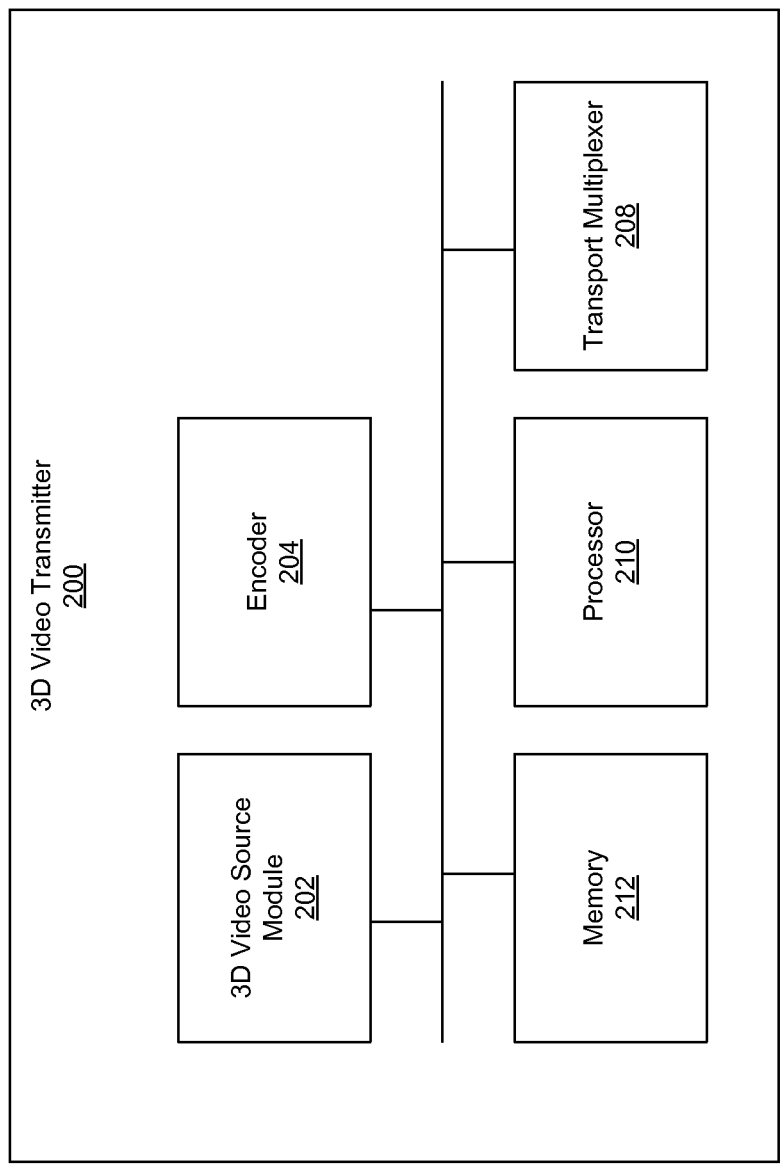
FIG. 2 is a block diagram illustrating an exemplary 3D video transmitter that is operable to provide 3D video coding using SVC temporal and spatial scalabilities, in accordance with an embodiment of the invention.

FIG. 2 is a block diagram illustrating an exemplary 3D video transmitter that is operable to provide 3D video coding using SVC temporal and spatial scalabilities, in accordance with an embodiment of the invention. Referring to FIG. 2, there is shown a 3D video transmitter 200. The 3D video transmitter 200 may comprise a 3D video source module 202, an encoder 204, a transport multiplexer 208, a processor 210 and a memory 212.

The 3D video source module 202 may comprise suitable logic, circuitry, interfaces and/or code that may be operable to capture and/or generate source 3D video content. The 3d video source module 202 may be operable, for example, to generate stereoscopic 3D video comprising such as left view and right view video data from the captured source 3D video content. The left view video and the right view video may be communicated to the encoder 204 for video encoding or compressing.

The encoder 204 may comprise suitable logic, circuitry, interfaces and/or code that may be operable to receive 3D video content from the 3D video source module 202 for video encoding. In an exemplary embodiment of the invention, the encoder 204 may be operable to encode a 3D video to generate a SVC base layer and a SVC enhancement layer. A first view and a second view of the 3D video in the SVC enhancement layer may be separate frames. The SVC base layer may comprise a first half-resolution view and a second half-resolution view of the 3D video. The first half-resolution view and the second half-resolution view may be packed in a single frame. For example, the first half-resolution view and the second half-resolution view may be packed in a side-by-side (half) format or in a top-and-bottom (half) format. In this regard, for example, the first half-resolution view may be a left half-resolution view of the 3D video, and the second half-resolution view may be a right half-resolution view of the 3D video. The first view in the SVC enhancement layer may comprise a first high-resolution view and the second view in the SVC enhancement layer may comprise a second high-resolution view. The high-resolution may comprise a resolution that may be greater than half resolution. In this regard, for example, the first high-resolution view may be a left full-resolution view of the 3D video, and the second high-resolution view may be a right full-resolution view of the 3D video. The left full-resolution view and the right full-resolution view may be in a stereoscopic format. The first half-resolution view in the SVC base layer may be a base-layer reference for the first high-resolution view in the SVC enhancement layer for inter-layer prediction of spatial scalable coding. The first high-resolution view in the SVC enhancement layer may be an intra-layer reference for the second high-resolution view in the SVC enhancement layer for intra-layer prediction of temporal scalable coding.

A total number of bits for the first half-resolution view may be different from a total number of bits for the second half-resolution view. A total number of bits for the first high-resolution view may be different from a total number of bits for the second high-resolution view. The first half-resolution view and the second half-resolution view may be generated in a single elementary stream for transmission to a 3D video receiver such as the 3D video receiver 130. Alternatively, the first half-resolution view may be in a first elementary stream and the second half-resolution view may be in a second elementary stream for transmission to the 3D video receiver 130. The first high-resolution view and the second high-resolution view may also be generated in a single elementary stream for transmission to the 3D video receiver 130. Alternatively, the first high-resolution view may be in a first elementary stream and the second high-resolution view may be in a second elementary stream for transmission to the 3D video receiver 130.

When operating in film mode, the encoder 204 may be operable to encode, using pulldown, the 3D video to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. In this regard, for example, when operating in film mode, a 3D video in 1080p24 film format at 24 Hz frame rate may be encoded by the encoder 204 to generate a SVC base layer in side-by-side (half) 1080i60 interlaced format at 30 Hz frame rate using 3:2 pulldown. In the mean time, the 3D video may be encoded to generate a SVC enhancement layer in stereoscopic 1080p24 format at 24 Hz frame rate.

In an exemplary embodiment of the invention, the SVC base layer stream may be backward compatible with existing systems such as AVC systems.

The transport multiplexer 208 may comprise suitable logic, circuitry, interfaces and/or code that may be operable to merge a plurality of encoded or compressed video sequences or streams into a single combined video stream or bitstream for transmission to a 3D video receiver such as the 3D video receiver 130. In an exemplary embodiment of the invention, the combined video stream may comprise one or more elementary streams of the SVC base layer and/or one or more elementary streams of the SVC enhancement layer.

The processor 210 may comprise suitable logic, circuitry, interfaces and/or code that may be operable to communicate with the 3D video source module 202, the encoder 204 and the transport multiplexer 208 to perform various functions of the 3D video transmitter 200 such as the SVC encoding function.

The memory 212 may comprise suitable logic, circuitry, interfaces and/or code that may be operable to store information such as executable instructions and data that may be utilized by the processor 210, the 3D video source module 202, the encoder 204 and/or the transport multiplexer 208 to perform various functions of the 3D video transmitter 200.

In operation, the encoder 204 may be operable to receive 3D video content from the 3D video source module 202 for video encoding. The encoder 204 may be operable to encode a 3D video to generate a SVC base layer and a SVC enhancement layer. A first view and a second view of the 3D video in the SVC enhancement layer may be separate frames. The SVC base layer may comprise a first half-resolution view and a second half-resolution view of the 3D video. The first half-resolution view and the second half-resolution view may be packed in a single frame. For example, the first half-resolution view and the second half-resolution view may be packed in a side-by-side (half) format or in a top-and-bottom (half) format. In this regard, for example, the first half-resolution view may be a left half-resolution view of the 3D video, and the second half-resolution view may be a right half-resolution view of the 3D video. The first view in the SVC enhancement layer may comprise a first high-resolution view and the second view in the SVC enhancement layer may comprise a second high-resolution view. The high-resolution may comprise a resolution that may be greater than half resolution. In this regard, for example, the first high-resolution view may be a left full-resolution view of the 3D video, and the second high-resolution view may be a right full-resolution view of the 3D video. The left full-resolution view and the right full-resolution view may be in a stereoscopic format. The first half-resolution view in the SVC base layer may be a base-layer reference for the first high-resolution view in the SVC enhancement layer for inter-layer prediction of spatial scalable coding. The first high-resolution view in the SVC enhancement layer may be an intra-layer reference for the second high-resolution view in the SVC enhancement layer for intra-layer prediction of temporal scalable coding.

A total number of bits for the first half-resolution view may be different from a total number of bits for the second half-resolution view. A total number of bits for the first high-resolution view may be different from a total number of bits for the second high-resolution view. The first half-resolution view and the second half-resolution view may be generated in a single elementary stream for transmission to a 3D video receiver such as the 3D video receiver 130. Alternatively, the first half-resolution view may be in a first elementary stream and the second half-resolution view may be in a second elementary stream for transmission to the 3D video receiver 130. The first high-resolution view and the second high-resolution view may also be generated in a single elementary stream for transmission to the 3D video receiver 130. Alternatively, the first high-resolution view may be in a first elementary stream and the second high-resolution view may be in a second elementary stream for transmission to the 3D video receiver 130. In this regard, the transmitted first half-resolution view, which may be used as the base-layer reference, may be independently decoded by the 3D video receiver 130 without a reference from other views.

When operating in film mode, the encoder 204 may be operable to encode, using pulldown, the 3D video to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. In this instance, for example, the transmitted SVC base layer, which may comprise the first half-resolution view and the second half-resolution view, may be decoded, by the 3D video receiver 130, to generate a decompressed 3D video with the half-resolution in the interlaced format having the higher frame rate. The transmitted SVC enhancement layer, which may comprise the first high-resolution view and the second high-resolution view, may be decoded to generate a decompressed 3D video with the high-resolution in the progressive format having the original frame rate. In this regard, for example, when operating in film mode, a 3D video in 1080p24 film format at 24 Hz frame rate may be encoded by the encoder 204 to generate a SVC base layer in side-by-side (half) 1080i60 interlaced format at 30 Hz frame rate using 3:2 pulldown. In the mean time, the 3D video may be encoded to generate a SVC enhancement layer in stereoscopic 1080p24 format at 24 Hz frame rate. Accordingly, the transmitted SVC base layer, which may be in the side-by-side (half) 1080i60 format, may be decoded by the 3D video receiver 130 to generate a decompressed 3D video in the side-by-side (half) 1080i60 format. The transmitted SVC enhancement layer which may be in the stereoscopic 1080p24 format may be decoded to generate a decompressed 3D video in a frame packing 1080p24 format, for example.

In an exemplary embodiment of the invention, the SVC base layer stream may be backward compatible with existing AVC systems. In this regard, the 3D video receiver 130 may be operable to decode the SVC base layer stream using the AVC method, while the SVC enhancement layer stream may be decoded using the SVC method with temporal scalability and spatial scalability. Accordingly, a 3D video with high resolution such as a full resolution 3D video may be provided using the SVC temporal scalability and spatial scalability. The SVC base layer may provide a half-resolution 3D video, which may be compatible with legacy systems such as AVC systems.

Figure 3:
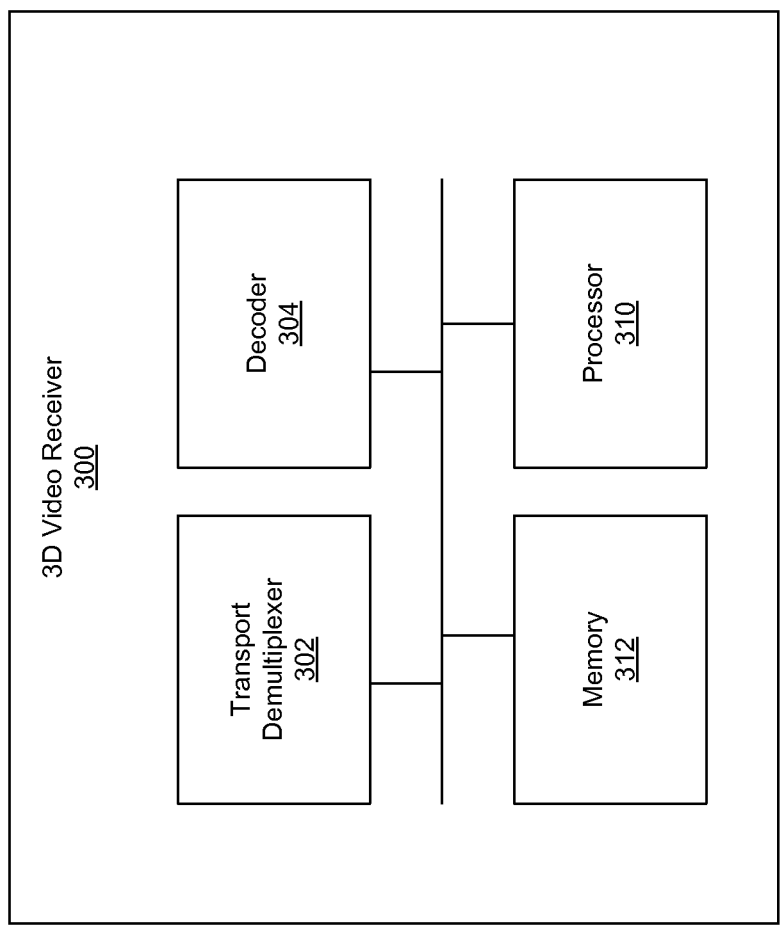
FIG. 3 is a block diagram illustrating an exemplary 3D video receiver that is operable to provide 3D video coding using SVC temporal and spatial scalabilities, in accordance with an embodiment of the invention.

FIG. 3 is a block diagram illustrating an exemplary 3D video receiver that is operable to provide 3D video coding using SVC temporal and spatial scalabilities, in accordance with an embodiment of the invention. Referring to FIG. 3, there is shown a 3D video receiver 300. The 3D video receiver 300 may comprise a transport demultiplexer 302, a decoder 304, a processor 310 and a memory 312.

The transport demultiplexer 302 may comprise suitable logic, circuitry, interfaces and/or code that may be operable to receive a 3D video stream such as the transport stream 120 from a 3D video transmitter such as the 3D video transmitter 110. The received 3D video stream may comprise one or more elementary streams of the SVC base layer and/or one or more elementary streams of the SVC enhancement layer. The transport demultiplexer 302 may be operable to demultiplex and/or parse the received 3D video stream for processing by the decoder 304.

The decoder 304 may comprise suitable logic, circuitry, interfaces and/or code that may be operable to decode or decompressed encoded 3D video which may be received form the transport demultiplexer 302. In an exemplary embodiment of the invention, the decoder 304 may be operable to decode the SVC base layer and/or the SVC enhancement layer. The SVC base layer may comprise, for example, a first half-resolution view and a second half-resolution view which may be packed in a single frame. The SVC enhancement layer may comprise, for example, a first high-resolution view and a second high-resolution view. The first half-resolution view may be used, for example, as a base-layer reference for the first high-resolution view in the SVC enhancement layer. In this regard, the decoder 304 may be operable to decode the first half-resolution view, which may be used as the base-layer reference, independently without a reference from other views.

When operating in film mode, the 3D video transmitter 110 may encode, using pulldown, the 3D video to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which comprises the first high-resolution view and the second high-resolution view, in a progressive format at the original frame rate. In this instance, for example, the decoder 304 may be operable to decode the received SVC base layer to generate a decompressed 3D video with the half-resolution in the interlaced format at the higher frame rate. The received SVC enhancement layer may be decoded to generate a decompressed 3D video with the high-resolution in the progressive format at the original frame rate. In this regard, for example, when operating in film mode, a 3D video in 1080p24 film format at 24 Hz frame rate may be encoded by the 3D video transmitter 110 to generate a SVC base layer in side-by-side (half) 1080i60 interlaced format at 30 Hz frame rate using 3:2 pulldown. In the mean time, the 3D video may be encoded to generate a SVC enhancement layer in stereoscopic 1080p24 format at 24 Hz frame rate. Accordingly, the decoder 304 may be operable to decode the received SVC base layer which may be in the side-by-side (half) 1080i60 format to generate a decompressed 3D video in the side-by-side (half) 1080i60 format. The received SVC enhancement layer which may be in the stereoscopic 1080p24 format may be decoded to generate a decompressed 3D video in frame packing 1080p24 format, for example.

In an exemplary embodiment of the invention, the SVC base layer stream may be backward compatible with existing AVC systems. In this regard, the decoder 304 may be operable to decode the SVC base layer stream using the AVC method, while the SVC enhancement layer stream may be decoded using the SVC method with temporal scalability and spatial scalability. Accordingly, a 3D video with high resolution such as a full resolution 3D video may be provided using the SVC temporal scalability and spatial scalability. The SVC base layer may provide a half-resolution 3D video which may be compatible with legacy systems such as AVC systems.

The processor 310 may comprise suitable logic, circuitry, interfaces and/or code that may be operable to communicate with the transport demultiplexer 302 and the decoder 304 to perform various functions of the 3D video receiver 300 such as the SVC decoding function.

The memory 312 may comprise suitable logic, circuitry, interfaces and/or code that may be operable to store information such as executable instructions and data that may be utilized by the processor 310, the transport demultiplexer 302 and/or the decoder 304 to perform various functions of the 3D video receiver 300.

In operation, the decoder 304 may be operable to decode the received SVC base layer and/or the SVC enhancement layer. The SVC base layer may comprise, for example, a first half-resolution view and a second half-resolution view which may be packed in a single frame. The SVC enhancement layer may comprise, for example, a first high-resolution view and a second high-resolution view. The first half-resolution view may be used, for example, as a base-layer reference for the first high-resolution view in the SVC enhancement layer. In this regard, the decoder 304 may be operable to decode the first half-resolution view, which may be used as the base-layer reference, independently without a reference from other views.

When operating in film mode, the 3D video transmitter 110 may encode, using pulldown, the 3D video to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which comprises the first high-resolution view and the second high-resolution view, in a progressive format at the original frame rate. In this instance, for example, the decoder 304 may be operable to decode the received SVC base layer to generate a decompressed 3D video with the half-resolution in the interlaced format at the higher frame rate. The received SVC enhancement layer may be decoded to generate a decompressed 3D video with the high-resolution in the progressive format at the original frame rate. In this regard, for example, when operating in film mode, a 3D video in 1080p24 film format at 24 Hz frame rate may be encoded by the 3D video transmitter 110 to generate a SVC base layer in side-by-side (half) 1080i60 interlaced format at 30 Hz frame rate using 3:2 pulldown. In the mean time, the 3D video may be encoded to generate a SVC enhancement layer in stereoscopic 1080p24 format at 24 Hz frame rate. Accordingly, the decoder 304 may be operable to decode the received SVC base layer, which may be in the side-by-side (half) 1080i60 format, to generate a decompressed 3D video in the side-by-side (half) 1080i60 format. The received SVC enhancement layer which may be in the stereoscopic 1080p24 format may be decoded to generate a decompressed 3D video having a frame packing 1080p24 format, for example.

In an exemplary embodiment of the invention, the SVC base layer stream may be backward compatible with existing AVC systems. In this regard, the decoder 304 may be operable to decode the SVC base layer stream using the AVC method, while the SVC enhancement layer stream may be decoded using the SVC method with temporal scalability and spatial scalability. Accordingly, a 3D video with high resolution such as a full resolution 3D video may be provided using the SVC temporal scalability and spatial scalability. The SVC base layer may provide a half-resolution 3D video which may be compatible with legacy systems such as AVC systems.

Figure 4:
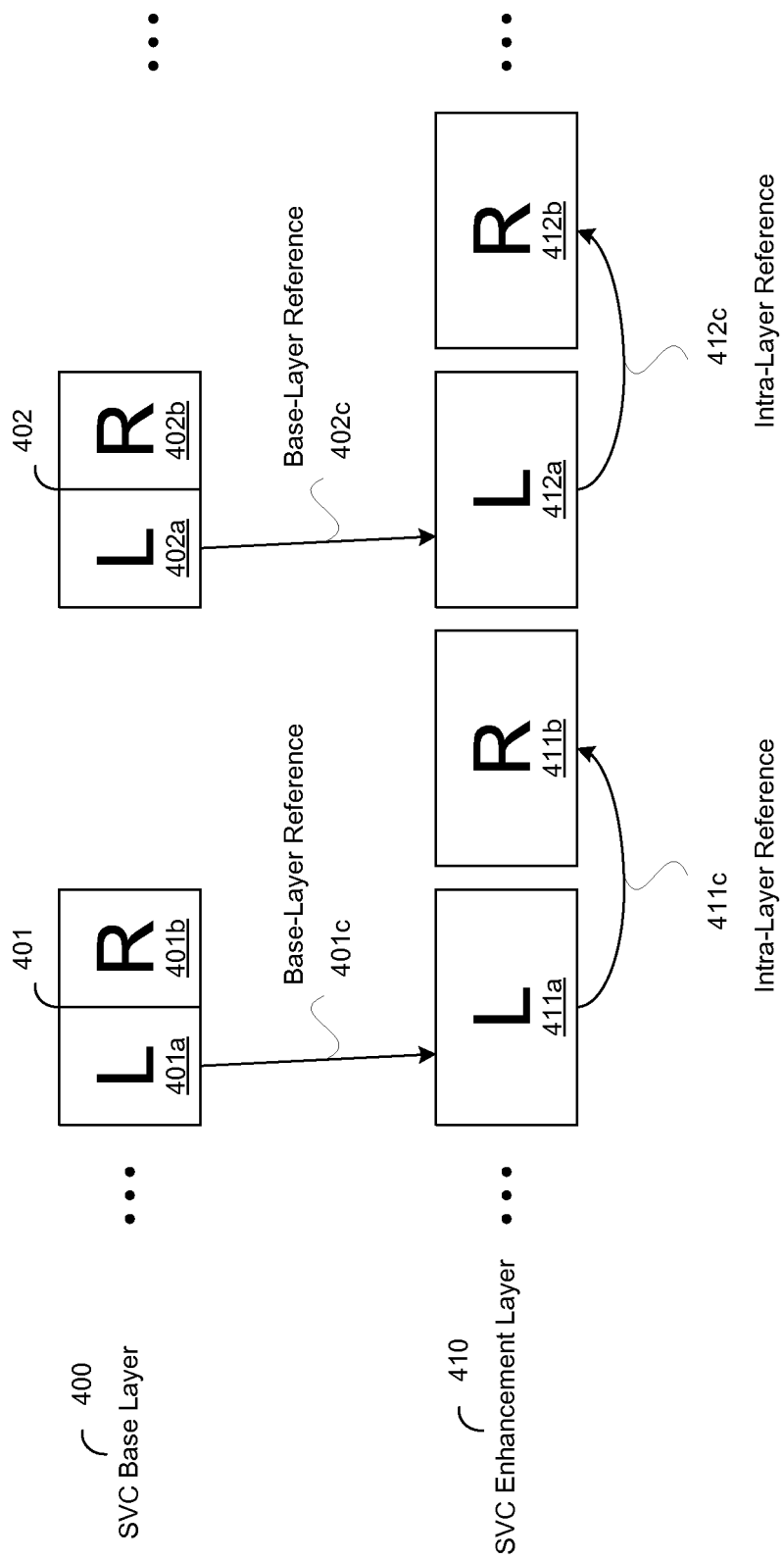
FIG. 4 is a block diagram illustrating an exemplary prediction of SVC temporal and spatial scalabilities, in accordance with an embodiment of the invention.

FIG. 4 is a block diagram illustrating an exemplary prediction of SVC temporal and spatial scalabilities, in accordance with an embodiment of the invention. Referring to FIG. 4, there is shown a SVC base layer 400 and a SVC enhancement layer 410. The SVC base layer 400 may comprise a left half-resolution view and a right half-resolution view packed in a single frame such as the frame 401 or the frame 402 in a side-by-side (half) format as illustrated by the left half-resolution view 401a, the right half-resolution view 401b, the left half-resolution view 402a and the right half-resolution view 402b. The SVC enhancement layer 410 may comprise a left high-resolution view and a right high-resolution view in a full-resolution stereoscopic format as illustrated by the left high-resolution view 411a, the right high-resolution view 411b, the left high-resolution view 412a and the right high-resolution view 412b. In this regard, the SVC enhancement layer 410 may be processed at a frame rate which is twice the frame rate of the SVC base layer 400.

In an exemplary embodiment of the invention, the left half-resolution view 401a in the SVC base layer 400 may be used as a base-layer reference 401c for the left high-resolution view 411a in the SVC enhancement layer 410 for inter-layer prediction of spatial scalable coding. The left half-resolution view 402a in the SVC base layer 400 may be used as a base-layer reference 402c for the left high-resolution view 412a in the SVC enhancement layer 410 for inter-layer prediction of spatial scalable coding. The left high-resolution view 411a in the SVC enhancement layer 410 may be used as an intra-layer reference 411c for the right high-resolution view 411b in the SVC enhancement layer 410 for intra-layer prediction of temporal scalable coding. The left high-resolution view 412a in the SVC enhancement layer 410 may be used as an intra-layer reference 412c for the right high-resolution view 412b in the SVC enhancement layer 410 for intra-layer prediction of temporal scalable coding.

In the exemplary embodiment of the invention illustrated in FIG. 4, the left half-resolution views 401a, 402a and the right half-resolution views 401b, 402b in side-by-side (half) format are shown, and the left high-resolution views 411a, 412a and the right high-resolution views 411b, 412b are shown. Notwithstanding, the invention is not so limited. A left half-resolution view and a right half-resolution view in the SVC base layer 400 may be packed in a top-and-bottom (half) format, for example. Instead of full resolution, a left view and a right view in the SVC enhancement layer 410, both with a resolution which is greater than half resolution and smaller than full resolution, may be illustrated.

Figure 5:
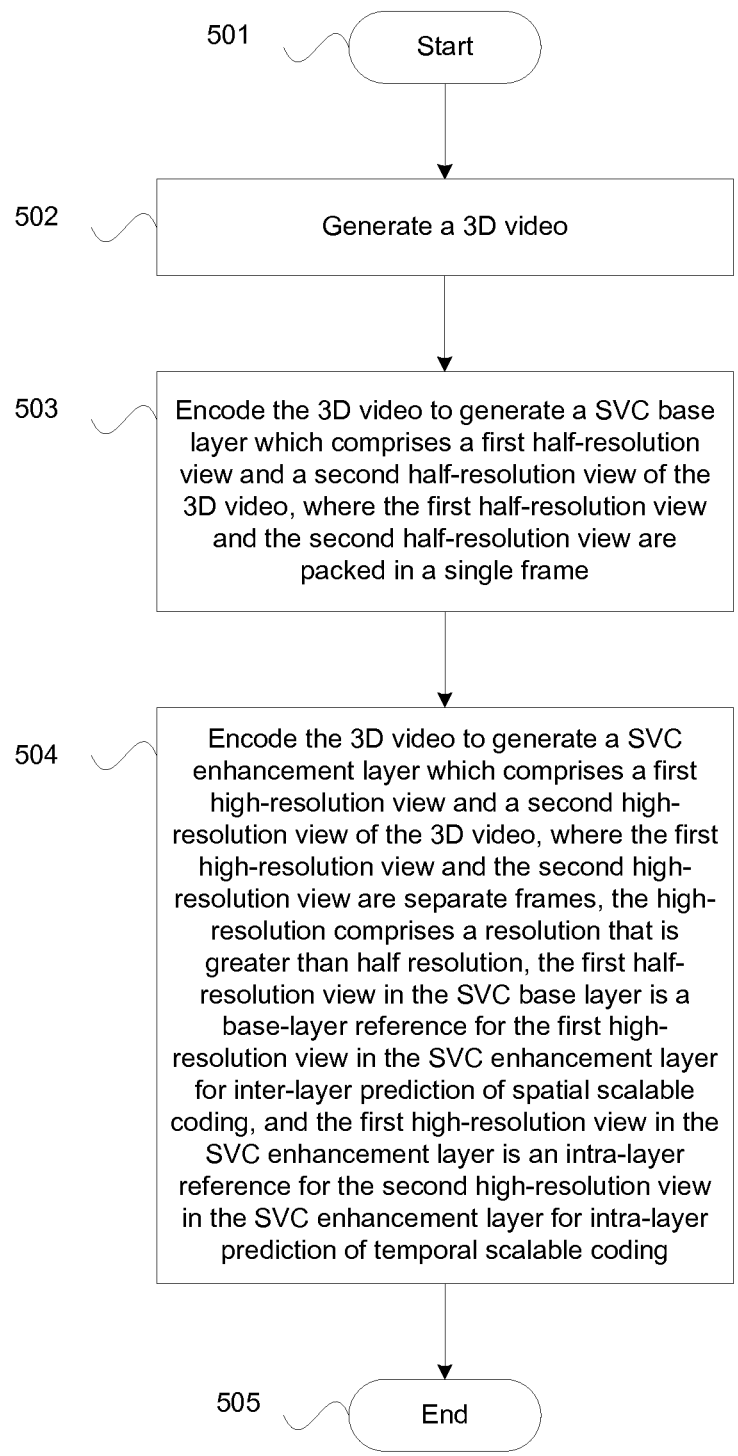
FIG. 5 is a flow chart illustrating exemplary steps for 3D video coding using SVC temporal and spatial scalabilities, in accordance with an embodiment of the invention.

FIG. 5 is a flow chart illustrating exemplary steps for 3D video coding using SVC temporal and spatial scalabilities, in accordance with an embodiment of the invention. Referring to FIG. 5, the exemplary steps start at step 501. In step 502, the 3D video source module 202 in the 3D video transmitter 200 may be operable to generate a 3D video. In step 503, the encoder 204 in the 3D video transmitter 200 may be operable to encode the 3D video to generate a SVC base layer 400 which may comprise a first half-resolution view 401a and a second half-resolution view 401b of the 3D video. The first half-resolution view 401a and the second half-resolution view 401b may be packed in a single frame 401. In step 504, the encoder 204 may be operable to encode the 3D video to generate a SVC enhancement layer 410 which may comprise a first high-resolution view 411a and a second high-resolution view 411b of the 3D video. The first high-resolution view 411a and the second high-resolution view 411b may be separate frames. The high-resolution may comprise a resolution that may be greater than half resolution. The first half-resolution view 401a in the SVC base layer 400 may be a base-layer reference for the first high-resolution view 411a in the SVC enhancement layer 410 for inter-layer prediction of spatial scalable coding. The first high-resolution view 411a in the enhancement layer 400 may be an intra-layer reference for the second high-resolution view 411b in the SVC enhancement layer 410 for intra-layer prediction of temporal scalable coding. The exemplary steps may proceed to the end step 505.

In various embodiments of the invention, an encoder 204 in a 3D video transmitter 200 may be operable to encode a 3D video to generate a SVC base layer 400 and a SVC enhancement layer 410. A first view and a second view of the 3D video in the SVC enhancement layer 410 may be separate frames. The SVC base layer 400 may comprise a first half-resolution view 401a and a second half-resolution view 401b of the 3D video. The first half-resolution view 401a and the second half-resolution view 401b may be packed in a single frame. The first view in the SVC enhancement layer 410 may comprise a first high-resolution view 411a and the second view in the SVC enhancement layer 410 may comprise a second high-resolution view 411b. The high-resolution may comprise a resolution that may be greater than half resolution. The first half-resolution view 401a in the SVC base layer 400 may be a base-layer reference 401c for the first high-resolution view 411a in the SVC enhancement layer 410 for inter-layer prediction of spatial scalable coding. The first high-resolution view 411a in the SVC enhancement layer 410 may be an intra-layer reference 411c for the second high-resolution view 411b in the SVC enhancement layer 410 for intra-layer prediction of temporal scalable coding.

In an exemplary embodiment of the invention, a total number of bits for the first half-resolution view 401a may be different from a total number of bits for the second half-resolution view 401b. A total number of bits for the first high-resolution view 411a may be different from a total number of bits for the second high-resolution view 411b. The 3D video transmitter 110 may be operable to transmit the first half-resolution view 401a and the second half-resolution view 401b in a single elementary stream in a transport stream 120 to a 3D video receiver 130. Alternatively, the first half-resolution view 401a may be transmitted in a first elementary stream and the second half-resolution view 401b may be transmitted in a second elementary stream in the transport stream 120 to the 3D video receiver 130. The 3D video transmitter 110 may be operable to transmit the first high-resolution view 411a and the second high-resolution view 411b in a single elementary stream in the transport stream 120 to the 3D video receiver 130. Alternatively, the first high-resolution view 411a may be transmitted in a first elementary stream and the second high-resolution view 411b may be transmitted in a second elementary stream in the transport stream 120 to the 3D video receiver 130. In this regard, the transmitted first half-resolution view 401a, which may be used as the base-layer reference 401c, may be independently decode by a decoder 304 in the 3D video receiver 300 without a reference from other views.

When operating in film mode, the encoder 204 may be operable to encode, using pulldown, the 3D video to generate the SVC base layer 400. The SVC base layer may comprise the first half-resolution view 401a and the second half-resolution view 401b, in an interlaced format at a higher frame rate that is higher than original frame rate of the 3D video. The 3D video may be encoded to generate the SVC enhancement layer 410, which may comprise the first high-resolution view 411a and the second high-resolution view 411b, in a progressive format at the original frame rate. In this instance, for example, the transmitted SVC base layer 400, which may comprise the first half-resolution view 401a and the second half-resolution view 401b, may be decoded, by the decoder 304 in the 3D video receiver 300, to generate a decompressed 3D video with the half-resolution in the interlaced format at the higher frame rate. The transmitted SVC enhancement layer 410, which may comprise the first high-resolution view 411a and the second high-resolution view 411b, may be decoded to generate a decompressed 3D video with the high-resolution in the progressive format at the original frame rate.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for 3D video coding using SVC temporal and spatial scalabilities.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
in a 3-dimensional (3D) video transmitter:
encoding a 3D video to generate a scalable video coding (SVC) base layer, a frame in said SVC base layer comprising a right half-resolution view of said 3D video and a left half-resolution view of said 3D video; and
encoding said 3D video to generate an SVC enhancement layer, a first frame in said SVC enhancement layer comprising a right high-resolution view and a second frame in said SVC enhancement layer comprising a left high-resolution view, wherein said first and second frames of said SVC enhancement layer each comprises a separate frame in said SVC enhancement layer and has a higher spatial resolution than said frame in said SVC base layer;
wherein:
said right half-resolution view in said SVC base layer is a reference for said right high-resolution view in said SVC enhancement layer for interlayer prediction of spatial scalable coding; and
said right high-resolution view in said SVC enhancement layer is an intra-layer reference for said left high-resolution view in said SVC enhancement layer for intra-layer prediction of temporal scalable coding.

2. The method according to claim 1, wherein a total number of bits for said right half-resolution view is different from a total number of bits for said left half-resolution view.

3. The method according to claim 1, wherein a total number of bits for said right high-resolution view is different from a total number of bits for said left high resolution view.

4. The method according to claim 1, comprising transmitting said right half-resolution view and said left half-resolution view in a single elementary stream to a 3D video receiver.

5. The method according to claim 1, comprising transmitting said right half-resolution view in a first elementary stream and said left half-resolution view in a second elementary stream to a 3D video receiver.

6. The method according to claim 1, comprising transmitting said right high-resolution view and said left high-resolution view in a single elementary stream to a 3D video receiver.

7. The method according to claim 1, comprising transmitting said right high-resolution view in a first elementary stream and said left high-resolution view in a second elementary stream to a 3D video receiver.

8. The method according to claim 1, comprising transmitting said frame in said SVC base layer comprising said right half-resolution view and said left half-resolution view, said first frame in said SVC enhancement layer comprising said right high-resolution view, and said second frame in said SVC enhancement layer comprising said left high-resolution view to a 3D video receiver, wherein said transmitted right half-resolution view is independently decoded by said 3D video receiver without a reference from other views.

9. The method according to claim 1, wherein:
encoding said 3D video to generate said SVC base layer comprises encoding said 3D video in an interlaced format at a higher frame rate than an original frame rate of said 3D video, using pulldown;
encoding said 3D video to generate said SVC enhancement layer comprises encoding said 3D video in a progressive format at said original frame rate of said 3D video; and
said method further comprises transmitting said SVC base layer and said SVC enhancement layer to a 3D video receiver, wherein:
said SVC base layer is decoded, with said 3D video receiver, to generate a decompressed 3D video at said half-resolution in said interlaced format at said higher frame rate; and
said SVC enhancement layer is decoded, with said 3D video receiver, to generate a decompressed 3D video at said high-resolution in said progressive format at said original frame rate.

10. A system for processing video, the system comprising:
one or more processors, one or more circuits, or any combination thereof for use in a 3-dimensional (3D) video transmitter, operable to:
encode a 3D video to generate a scalable video coding (SVC) base layer, a frame in said SVC base layer comprising a right half-resolution view and a left half-resolution view; and encode said 3D video to generate a SVC enhancement layer, a first frame in said SVC enhancement layer comprising a right high-resolution view and a second frame in said SVC enhancement layer comprising a left high-resolution view, wherein said first and second frames of said SVC enhancement layer each comprises a separate frame in said SVC enhancement layer and has a higher spatial resolution than said frame in said SVC base layer;
wherein
said right half-resolution view in said SVC base layer is a base-layer reference for said right high-resolution view in said SVC enhancement layer for interlayer prediction of spatial scalable coding; and
said right high-resolution view in said SVC enhancement layer is an intra-layer reference for said left high-resolution view in said SVC enhancement layer for intra-layer prediction of temporal scalable coding.

11. The system according to claim 10, wherein a total number of bits for said right half-resolution view is different from a total number of bits for said left half-resolution view.

12. The system according to claim 10, wherein a total number of bits for said right high-resolution view is different from a total number of bits for said left high-resolution view.

13. The system according to claim 10, wherein said one or more processors, one or more circuits, or any combination thereof is operable to transmit said right half-resolution view and said left half-resolution view in a single elementary stream to a 3D video receiver.

14. The system according to claim 10, wherein said one or more processors, one or more circuits, or any combination thereof is operable to transmit said right half-resolution view in a first elementary stream and said left half-resolution view in a second elementary stream to a 3D video receiver.

15. The system according to claim 10, wherein said one or more processors, one or more circuits, or any combination thereof is operable to transmit said right high-resolution view and said left high-resolution view in a single elementary stream to a 3D video receiver.

16. The system according to claim 10, wherein said one or more processors, one or more circuits, or any combination thereof is operable to transmit said right high-resolution view in a first elementary stream and said left high-resolution view in a second elementary stream to a 3D video receiver.

17. The system according to claim 10, wherein said one or more processors, one or more circuits, or any combination thereof is operable to transmit said frame in said SVC base layer comprising said right half-resolution view and said left half-resolution view, said first frame in said SVC enhancement layer comprising said right high-resolution view, and said second frame in said SVC enhancement layer comprising said left high-resolution view to a 3D video receiver, wherein said transmitted right half-resolution view is independently decoded by said 3D video receiver without a reference from other views.

18. The system according to claim 10, wherein said one or more processors, one or more circuits, or any combination thereof is operable to:
encode said 3D video to generate said SVC base layer in an interlaced format at a higher frame rate than an original frame rate of said 3D video, using pulldown;
encode said 3D video to generate said SVC enhancement layer in a progressive format at said original frame rate of said 3D video; and
transmit said SVC base layer and said SVC enhancement layer to a 3D video receiver,
wherein:
said SVC base layer is decoded, with said 3D video receiver, to generate a decompressed 3D video at said half-resolution in said interlaced format at said higher frame rate; and
said SVC enhancement layer is decoded, with said 3D video receiver, to generate a decompressed 3D video at said high-resolution in said progressive format at said original frame rate.

19. A method for processing video, the method comprising:
- encoding, with a 3-dimensional (3D) video encoder, a 3D video to generate a base layer, a frame in said base layer comprising a right half-resolution view and a left half-resolution view; and
- encoding, with said 3D video encoder, said 3D video to generate an enhancement layer, a first frame in said enhancement layer comprising a right high-resolution view and a second frame in said enhancement layer comprising a left high-resolution view, said first and second frames of said enhancement layer each having a higher spatial resolution than said right half-resolution view and said left half-resolution view in said base layer;

wherein:
- said right half-resolution view in said base layer is a reference for said right high-resolution view in said enhancement layer for interlayer prediction of spatial scalable coding; and
- said right high-resolution view in said enhancement layer is an intra-layer reference for said left high-resolution view in said enhancement layer for intra-layer prediction of temporal scalable coding.

20. The method according to claim 19, wherein:
- encoding said 3D video to generate said base layer comprises encoding said 3D video in an interlaced format at a higher frame rate than an original frame rate of said 3D video;
- encoding said 3D video to generate said enhancement layer comprises encoding said 3D video in a progressive format at said original frame rate of said 3D video; and
- said method further comprises transmitting said base and enhancement layers to a 3D video receiver, wherein:
- said transmitted base layer is decoded, with said 3D video receiver, to generate a decompressed 3D video at said half-resolution in said interlaced format at said higher frame rate; and
- said transmitted enhancement layer is decoded, by with said 3D video receiver, to generate a decompressed 3D video at said high-resolution in said progressive format at said original frame rate.

* * * * *